United States Patent

Heger

Patent Number: 5,619,128
Date of Patent: Apr. 8, 1997

[54] STUD SENSOR WITH OVER-STUD MISCALIBRATION VIA CIRCUIT WHICH STORES AN INITIAL CALIBRATION DENSITY, COMPARES THAT TO A CURRENT TEST DENSITY AND OUTPUTS RESULT VIA INDICATOR

[75] Inventor: Charles E. Heger, Saratoga, Calif.

[73] Assignee: Zircon Corporation, Campbell, Calif.

[21] Appl. No.: 303,268

[22] Filed: Sep. 8, 1994

Related U.S. Application Data

[62] Division of Ser. No. 931,189, Aug. 14, 1992, Pat. No. 5,352,974.

[51] Int. Cl.$^6$ ............................. G01R 19/06; G01R 35/02
[52] U.S. Cl. ............................................. 324/67; 324/202
[58] Field of Search ....................... 324/66, 67, 326–329, 324/601, 658, 662, 663, 671, 672, 676, 686, 690; 334/202, 228; 364/571.01

[56] References Cited

U.S. PATENT DOCUMENTS

| | | | |
|---|---|---|---|
| 3,278,843 | 10/1966 | Deming et al. | |
| 3,704,413 | 11/1972 | Blevins | 324/67 |
| 3,836,848 | 9/1974 | Blevins | 324/67 |
| 4,041,382 | 8/1977 | Washburn | 324/601 |
| 4,067,225 | 1/1978 | Dorman et al. | 324/601 |
| 4,086,528 | 4/1978 | Walton. | |
| 4,099,118 | 7/1978 | Franklin et al. | 324/67 X |
| 4,130,796 | 12/1978 | Shum | 324/671 |
| 4,322,678 | 3/1982 | Capots et al. | |
| 4,464,622 | 8/1984 | Franklin | 324/67 |
| 4,676,100 | 6/1987 | Eichberger | 324/601 |
| 4,847,552 | 7/1989 | Howard | 324/67 |
| 4,853,617 | 8/1989 | Douglas et al. | |
| 4,939,455 | 7/1990 | Tsugawa et al. | |
| 4,947,116 | 8/1990 | Welcome et al. | |
| 4,992,741 | 2/1991 | Douglas et al. | |
| 5,023,484 | 6/1991 | Pathak et al. | |

*Primary Examiner*—Sandra L. O'Shea
*Assistant Examiner*—Roger Phillips
*Attorney, Agent, or Firm*—Skjerven, Morrill, MacPherson, Franklin & Friel; Norman R. Klivans

[57] ABSTRACT

A dual sensitivity stud sensor senses studs through both thick and thin surfaces. Studs are sensed by detecting a change in the capacitive loading of plates as they are moved along a surface and into proximity with a stud. The sensor informs the operator when the sensor has (incorrectly) been calibrated over a stud. The sensor also informs the operator if the sensor is placed against a surface either too thick or too thin for stud detection. Through use of a digital register, the sensor remains calibrated indefinitely while the sensor is powered on.

7 Claims, 3 Drawing Sheets

1

STUD SENSOR WITH OVER-STUD MISCALIBRATION VIA CIRCUIT WHICH STORES AN INITIAL CALIBRATION DENSITY, COMPARES THAT TO A CURRENT TEST DENSITY AND OUTPUTS RESULT VIA INDICATOR

This application is a division of application Ser. No. 07/931,189, filed Aug. 14, 1992, now U.S. Pat. No. 5,352,974, issued Oct. 4, 1994.

BACKGROUND OF THE INVENTION

1. Field of the Invention

This invention relates to an electronic sensor, and, in particular, to a sensor suitable for detecting the location of studs behind a variety of surfaces, including walls, floors and similar type structures. More specifically, the invention relates to an electronic stud sensor with two sensitivity modes for determining the location of studs behind either thick or thin surfaces, and with the ability to inform the user when the sensor has been calibrated over a stud.

2. Description of the Prior Art

U.S. Pat. No. 4,464,622 issued Aug. 7, 1984, and incorporated by reference herein, discloses an electronic wall stud sensor particularly suitable for locating a wall stud positioned behind a wall surface. The sensor detects the stud by measuring a change in the capacitance of the wall due to the presence of a stud while the sensor is moved along the wall surface. The sensor includes a plurality of capacitor plates mounted in the sensor close to the wall surface, a circuit for detecting any changes in the capacitance of the capacitor plates due to a change in the dielectric constant of the wall caused by the location of a stud positioned behind the wall surface and immediately adjacent to the capacitor, and an indicator for indicating the change in capacitance of the capacitor plate, thereby indicating the wall stud position. The sensor also alerts the operator when calibration is occurring.

While the above described electronic wall stud sensor operates as described to locate studs in walls, experience shown that its performance could be improved in several respects. The stud sensor is unable to reliably sense studs through surfaces significantly thicker than the typical ⅝ inch sheetrock wall. For instance, the sensor can not sense floor joists (another type of stud) under a combination of ¾ inch subfloor and ¼ inch oak flooring.

Moreover, the stud sensor is incapable of informing the operator when the sensor has been calibrated over a stud. When the sensor is subsequently moved from the stud after completion of this incorrect calibration, it is unable to detect studs and no indication is given that the sensor was incorrectly calibrated. Finally, the stud sensor's correct calibration voltage has a tendency to "leak off," due to use of a sample-and-hold capacitor. This results in less accurate readings after approximately a minute of use.

Therefore, there is a need to sense studs through both thick and thin surfaces. There is also a need to determine when the device has been calibrated over a stud, and informing the operator of this. Further, there is a need for a circuit which maintains calibration indefinitely.

SUMMARY OF THE INVENTION

In accordance with the present invention, a dual sensitivity stud sensor senses studs through both thick and thin surfaces. The sensor also has the ability to sense both an increase and a decrease in density. This allows the device to inform the user when the sensor has been incorrectly calibrated over a stud. Further, the device will notify the operator when the surface being sensed is either too thick or too thin for stud detection. By use of a digital register to store calibration data, calibration is maintained indefinitely while the stud sensor is powered on.

Finally, through use of a tri-state driver and a D type flip-flop, a single IC pin of the stud sensor circuitry is employed as both an input and an output, and becomes, in effect, a bi-directional port.

DETAILED DESCRIPTION OF THE INVENTION

Operation

Figure 1:
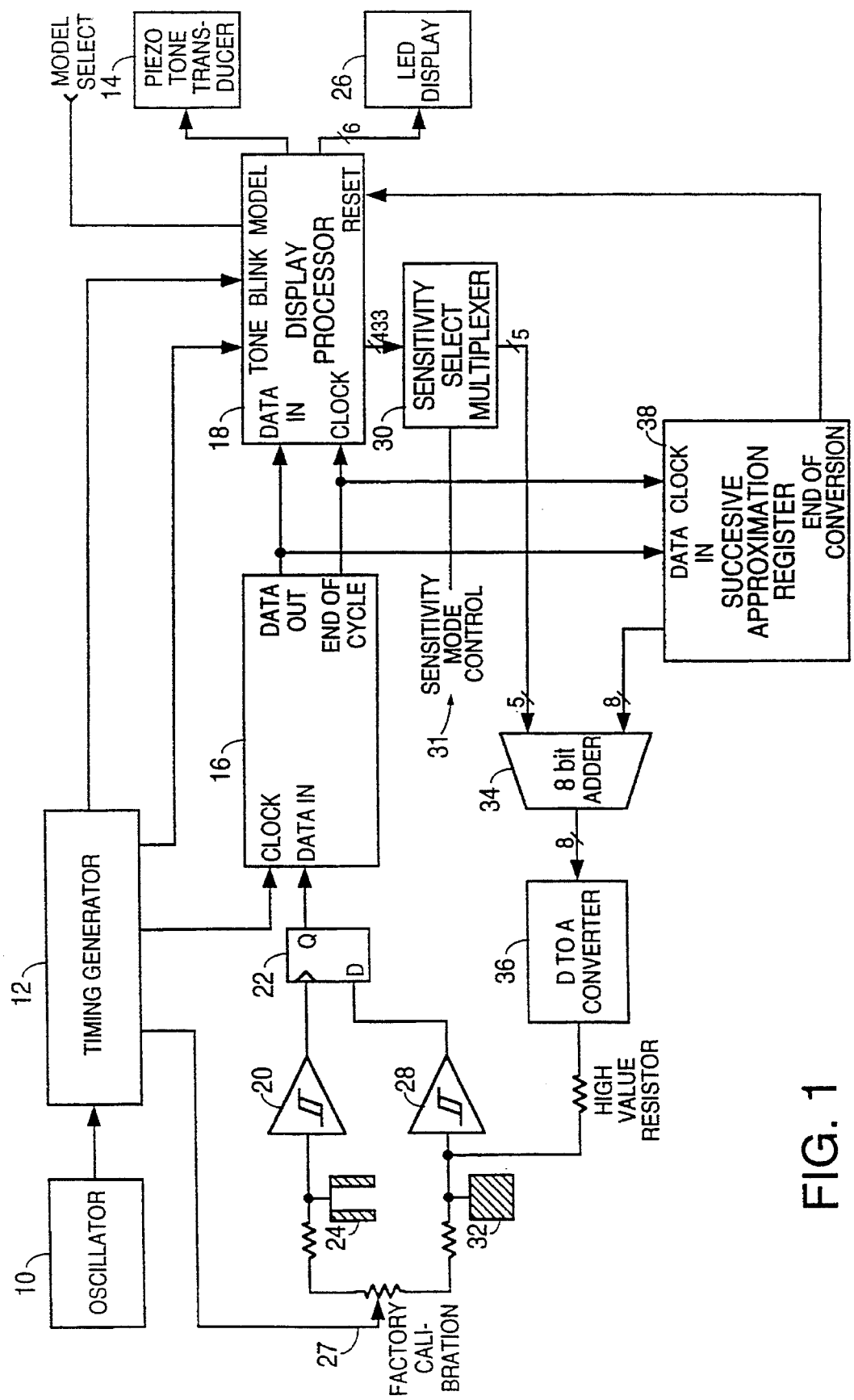
FIG. 1 is a block diagram of an embodiment of the invention.

Shown in FIG. 1 is an embodiment of the invention for locating positions of studs behind a surface through capacitive sensing.

As in the prior art patent referenced above, operation of this circuit detects the change in capacitive loading of the sensor plates 24 and 32 as they are moved along a surface and into proximity with a stud. Plate 32 is positioned between a pair of coupled plates 24 in the same manner as the plates in the prior art. Schmitt triggers 20 and 28 function in the same manner as the one shot multi-vibrators described in the prior art patent. Therefore, as in the prior art patent, additional capacitive loading due to the presence of a stud unbalances a differential capacitive plate circuit.

However, in accordance with one feature of this invention, the unbalance is traced via a counter in the display processor 18 which injects an offset voltage into the sensor plate circuit via a digital-to-analog (D/A) converter 36. Each step of the counter corresponds to a unique voltage step certain steps of which are also associated with a particular LED in the LED display 26.

As additional capacitive loading occurs due to the stud density, the LEDs in LED display 26 correspondingly change, signaling the stud's presence. The unit is calibrated such that the top LED illuminates as the unit is directly over the edge of a stud, with intermediate LEDs showing the approach to the stud's edge. A tone output from the piezo electric tone transducer 14 occurs concurrent with the illumination of the top LED of the LED display 26.

Figure 2:
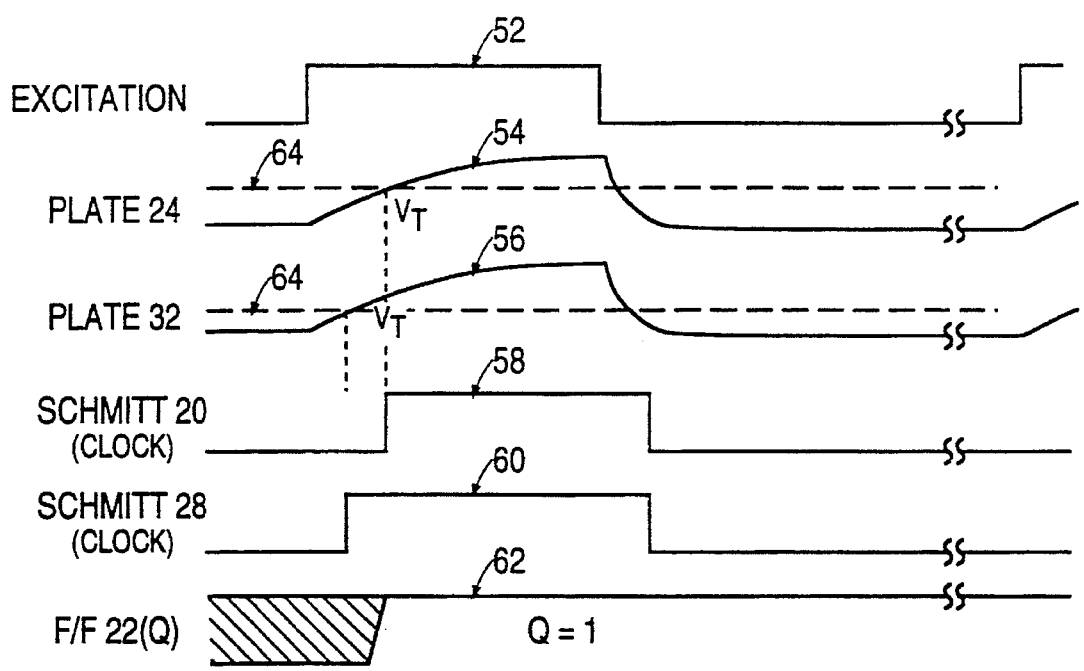
FIG. 2 shows various waveforms of the sensing portion of the circuit of FIG. 1.

The capacitive null of the sensor plates, i.e., when each sensor plate is equally "loaded," is also sensed through the Schmitt triggers 20 and 28. As shown in FIG. 2, the outputs from these Schmitt triggers then drive respectively the clock input 58 and data input 60 of a D type flip-flop 22. If the plates are unequally "loaded," either the clock input 58 or the data input 60 to the flip-flop 22 will occur first, setting the output 62 of the flip-flop to either a one or a zero. A null, or balanced differential plate capacitive state, is detected by increasing, in small incremental steps, via the digital-to-analog (D/A) converter 36, the offset injection voltage to the sensor plate circuit until the output 62 of the flip-flop 22 changes state. This signals a null condition.

As also shown in FIG. 2, the sensor plate circuit is driven by an excitation signal 52. This excitation signal is derived from a timing generator 12, which is in turn driven by an oscillator 10. This excitation signal consists of a $1/16$ duty cycle pulse which charges the capacitance of the sensor plates 24 and 32. The voltage 54 and 56 at the sensor plates 24 and 32 then rises exponentially and at some point reaches the upper voltage threshold 64 of the Schmitt triggers 20 and 28. The change in logic level at the Schmitt triggers 20 and 28 outputs then drives the D type flip-flop 22 clock input 58 and data input 60 to determine which signal, clock 58 or data 60, arrived first. A null condition is then defined as the clock and data signals occurring at the same time. In actuality, these two signals do not occur "exactly" simultaneously but are very close at null, with a resolution determined by the least significant bit resolution of the D/A converter 36. The excitation signal 52 then goes to a "zero" for $15/16$ of the excitation period allowing the capacitance of the sensor plates 20 and 28 to fully discharge.

The data input terminal of the averager 16 is connected to the D type flip-flop 22 output terminal. The averager 16 receives a 10 KHz clock signal from the timing generator 12. Therefore, every 100 microseconds, the averager 16 determines if the output of the flip-flop 22 is a one or a zero. There are two counters within the averager 16. One is a counter which counts to sixty-four, and starts over again once it reaches sixty-four. The other counter in the averager 16 is an accumulator counter, and is only incremented if the input from the flip-flop 22 is a one. If the input from the flip-flop 22 is zero, the counter is not incremented. Therefore, at the end of sixty-four cycles, the accumulator counter in the averager 16 will have accumulated the number of times the output from the flip-flop 22 was one. If the accumulator counter has accumulated less than 28 ones after sixty-four cycles, the output of the averager 16 is zero. If the accumulator counter has accumulated greater than 36 ones, the output of the averager 16 is one. Finally, if the count was between 28 and 36, then there is no change in the output of the averager 16.

The advantage of this averager 16 is that the output of the averager is "crisp," i.e., the changes in the output from the flip-flop 22 which occur as a result of noise are eliminated. This is due to the noise area which is centered around fifty percent (28 to 36 counts), in which the output of the averager does not change. So, as the noise is reduced from the output of the averager 16, the transition between the lighting of the LED's 26 is more smooth and precise. There is no wavering or flickering.

The display processor 18 receives the output of the averager 16. The Display Processor 18 includes a 4 bit up counter, with decoded states 12 through 15 each enabling an individual latch and LED steering logic. Each of these four latches receives the output of averager 16 on their data inputs. Thus at the end of any averaging cycle coinciding with states 12 through 15 of the counter, the data result is latched into the appropriate latch. The four outputs of the latches are used to enable the LED Display 26, with steering logic between the latch outputs and the LED drivers to allow for various device models.

The four bit output of the Display Processor 18 also drives the four bit input of the sensitivity select multiplexer 30 which in turn drives the five bit input of the Adder 34. During the calibration cycle, the counter of the Display Processor 18 is held in reset at state 11, one state less than the lowest display LED at state 12. The unit also senses a decrease in density by adding a fifth latch at counter state 6 such that if a sensor null is detected at state 6 or below, this condition is signaled to the user.

In normal operation, with the unit calibrated at counter state 11 (assuming the unit was not calibrated over or near a stud), the sensor null state will occur at counter state 11 when not over a stud and as a stud is approached, the null state will progress to counter states 12 through 15, progressively lighting the display LED's 26.

If however, the unit was calibrated over a stud and then is moved laterally away from the stud, the null state will progress downward from counter state 11 until the null is at counter state 6, signalling a sufficient decrease in density to signal the operator of an (erroneous) over-the-stud calibration situation.

Counter state 6 is a compromise between still allowing normal operation if the unit was calibrated somewhat in proximity to a stud, which will still allow adequate sensing of a stud while still allowing small decreases in density from the calibrated condition due to wall texture, etc. and actually calibrating very close to or over a stud, which could prevent normal stud sensing.

The four bit output 33 from the Display Processor 18 is inputted into a sensitivity select multiplexer 30. The sensitivity select multiplexer 30 is controlled by the sensitivity mode control signal 31.

Figure 3:
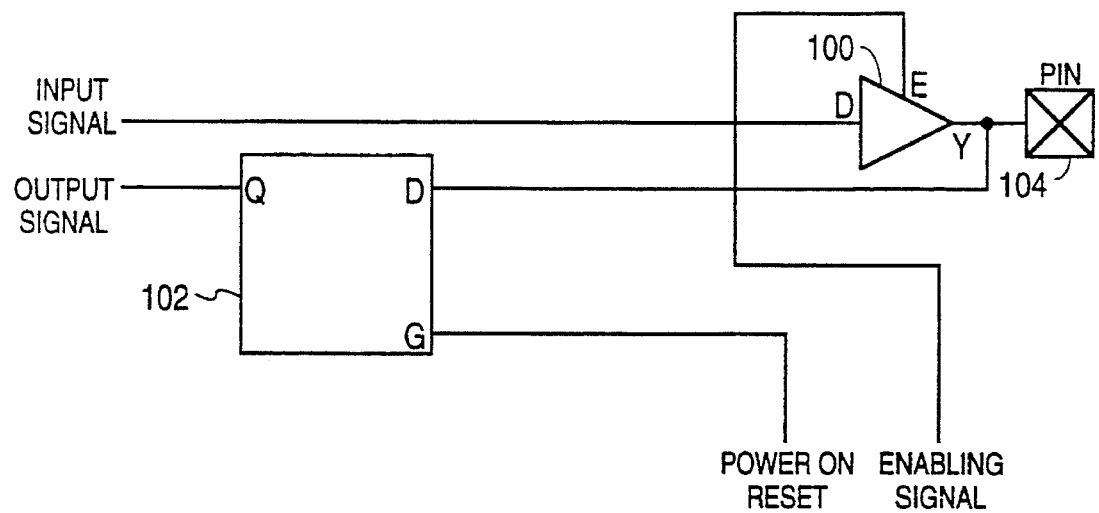
FIG. 3 is a schematic of a circuit allowing both input to and output from a single pin of an integrated circuit.
Figure 4:
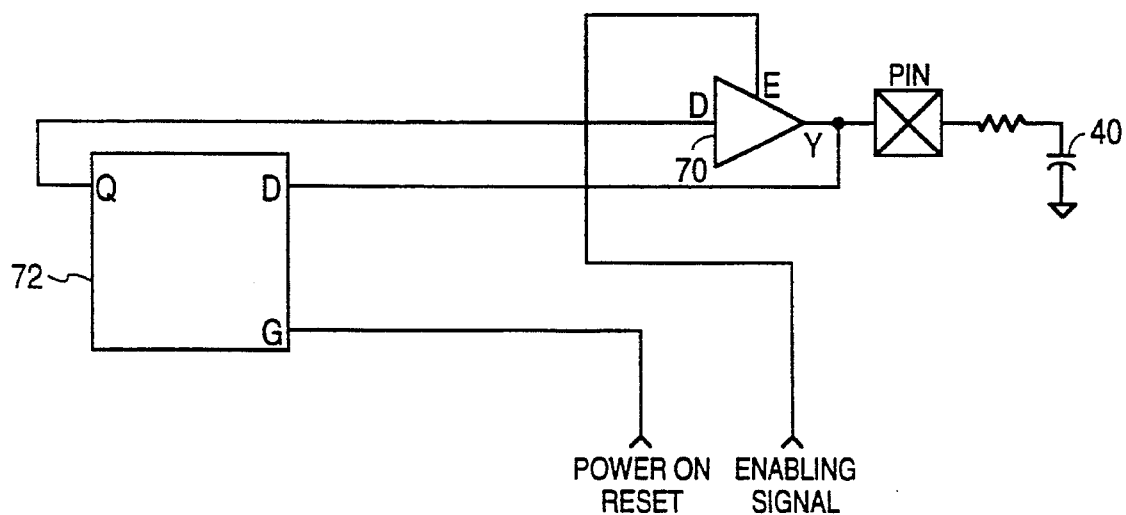
FIG. 4 is a schematic showing the capacitive memory for keeping track of the time at which the stud sensor is powered up.

The sensitivity mode control signal 31 is either a one, for high sensitivity mode, or zero, for normal sensitivity mode. The user controls which mode the device operates in. When the power switch is pressed, the device is in normal sensitivity mode and the sensitivity mode control signal 31 is zero. Capacitive memory keeps track of when the device is turned on. This capacitive memory is accomplished by the specialized use of a bilateral port similar to that shown in FIG. 3. FIG. 4 shows one embodiment of this capacitive memory. During Power On Reset, which occurs during the first 50 microseconds after application of power, the charge on capacitor 40 is set into the latch 72. After Power On Reset has subsided and after the first sixteen clock pulses, the output driver 70 is enabled via the Enabling Signal. The state of the output level is then opposite that during Power On Reset due to the inverted Q output being fed to the output driver 70. The "memory" capacitor, 40, then charges or discharges to the opposite state prior to the Power On Reset cycle of the next power cycle, then sets the latch 72 to the opposite state.

The external capacitor/resistor values are chosen to retain a charge sufficient for logic level detection for about 2 to 3 seconds to allow the user to cycle the power switch and thus toggle the sensitivity of the unit between Normal and High. The unit always powers up in Normal sensitivity mode after being off for greater than 10 seconds. If the power switch is released and then repressed after the initial powering up of the device within a period of time determined by the capacitive memory R-C time constant, the device enters high sensitivity mode and the sensitivity mode control signal 31 is one.

Thus depending upon the sensitivity mode control signal 31, the sensitivity select multiplexer receives the four bit output 33 from the display processor and directs these four bits to either bits 1 thru 4 or bits 2 thru 5 of the five bit input of the adder 34. The unused bit (either bit 1 or 5) of the 5 bit input to the adder 34 is grounded.

A successive approximation register (SAR) 38 also receives the output from the averager 16. The SAR 38 does rapid A/D conversion, needing only 8 clock cycles (for 8 bits) to accomplish the conversion. The SAR 38 is generally coupled with some other D/A structure (the D/A converter 36 in one embodiment), and produces an analog voltage based on its 8 bit input.

An eight bit adder 34 then receives the output from the display processor 18 via the sensitivity select multiplexer 30, and the output from the successive approximation register 38, and sums them digitally. If the 8 bits of the successive approximation register 38 are referred to as bits 1 thru 8, in normal sensitivity mode, the four bits of the display processor 18 are only added to bits 2 thru 5 of the successive approximation register 38. In high sensitivity mode, the four bits of the Display Processor 18 are added to bits 1 thru 4 of the successive approximation register 38. So, in high sensitivity mode, the least significant bit (LSB) from the Display Processor 18 is added to the LSB of the 5 bit adder 34 input, causing each step of the Display Processor to step the D/A converter 36 by one bit.

In Normal sensitivity modes, the LSB from the Display Processor 18 is added to the second LSB of the adder 34, causing each Display Processor 18 step to step the D/A converter 36 by two bits, thus halving the sensitivity.
Calibration When the unit is initially placed on a wall and then turned on, the counter in the display processor 18 is held at the calibrated value 1011 binary (11 decimal) and the unit determines the required offset injection voltage to the sensor circuit to produce a capacitive null of the two sensor plates 24 and 32.

After the calibration cycle is complete, the unique 8 bit calibration word which corresponds to the required offset injection voltage is stored in the successive approximation register 38 and summed with the four bit output 33 of the Display Processor counter 18 by the eight bit adder 36. Depending on the sensitivity required, the 4 bit output 33 is either summed with bits 1–4 or bits 2–5 of the 8 bit calibration word. The sensitivity is operator selectable through the sensitivity mode control 31.

If the user happens to calibrate the prior art device over a stud, when the device is moved away from the stud, the device has no response and will not sense studs. As the device is looking for an increase in density, and it has been calibrated where the wall is most dense, no increase will be detected.

In accordance with another feature of the invention, the invention will sense both an increase and decrease in density. So, if the device is calibrated over a stud, and a density decrease is sensed, the operator is signalled via the piezo electric tone transducer 14 and the LED display 26, that he has in fact calibrated over a stud, and should move the device and recalibrate.

Moreover, in the prior art, there is a capacitive leakage problem which invalidates the calibration after 45–60 seconds. In accordance with the present invention, the calibration will remain constant due to the all-digital design.

Finally, factory calibration is simply done by adjusting a potentiometer 27 while holding the 8 bit D/A converter 36 at a fixed value.
Bidirectional driver Shown in FIG. 3 is a feature in accordance with invention for using IC pins such as pin 104 as a terminal for both an output signal and input signal. It is to be understood that in one embodiment, much of the circuitry of FIG. 1 is incorporated into a single custom integrated circuit. During power-on reset of this IC, the D type flip-flop 102 receives data input on its terminal D from the IC pin 104, with the Power On Reset signal enabling the latch 102. After Power On Reset has ceased, and after 16 clock cycles, a latch (not shown) is set whose output is an enabling signal which enables the outputs of all bilateral, tri-state ports including tri-state output buffer 100.

Various embodiments of the invention have been described. The descriptions are intended to be illustrative, not limitative. Thus, it will be apparent to one skilled in the art that certain modifications may be made to the invention as described without departing from the scope of the claims set out below.

I claim:

1. A method for determining miscalibration of a stud sensing device for finding a location of a stud positioned behind a surface, comprising the steps of:

placing the stud sensing device in a calibration mode;

attempting to calibrate the stud sensing device by holding it at a first location on the surface in the calibration mode;

moving the stud sensing device to a second location on the surface;

placing the stud sensing device in an operating mode;

determining in the stud sensing device if said calibration attempt has occurred when the stud sensing device was located over a stud by comparing a density sensed at the first location in the calibration mode to a density sensed at the second location in the operating mode; and indicating that the calibration attempt has occurred over a stud when the sensed density at the second location in the operating mode is less than that sensed at the first location in the calibration mode.

2. The method of claim 1, further comprising, before the step of attempting to calibrate;

setting the stud sensing device to one of a formal sensitivity mode or a high sensitivity mode.

3. The method of claim 1, wherein the step of attempting to calibrate includes:

providing an analog signal that nulls an output signal of a sensor portion of the stud sensing device; and storing a digital representative of the analog signal in the stud sensing device.

4. The method of claim 1, wherein the step of indicating includes providing both an audible and visible indication.

5. The method of claim 1, wherein the step of indicating include providing an indication of a need to recalibrate the stud sensing device.

6. A stud sensing device capable of providing an indication of when it has erroneously been calibrated at a location over a stud, comprising;

a sensor adapted to be applied to a surface, thereby determining a density behind the surface;

a calibration circuit operationally connected to the sensor for providing to the sensor a signal of the sensor in a calibration mode of the stud sensing device; and indicator circuitry for comparing a determined density in the calibration mode to a determined density in an operating mode of the stud sensing device, and indicating a miscalibration when the determined density in the calibration mode is greater than that in the operating mode.

7. A method for determining miscalibration of a stud sensing device for finding a location of a stud positioned behind a surface, comprising the steps of:

attempting to calibrate the stud sensing device by holding it at a first location on the surface;

moving the stud sensing device to a second location on the surface;

determining in the stud sensing device if said calibration attempt has occurred when the stud sensing device was located over a stud by comparing a density sensed at the first location to a density sensed at the second location; and indicating that the calibration attempt has occurred over a stud when the sensed density at the second location is less than that sensed at the first location;

wherein the step of attempting to calibrate includes:
providing an analog signal that nulls an output signal of a sensor portion of the stud sensing device; and
storing a digital representative of the analog signal in the stud sensing device.

* * * * *